US012647043B2

(12) United States Patent
Lee et al.

(10) Patent No.:  US 12,647,043 B2
(45) Date of Patent:  Jun. 2, 2026

(54) SINGLE-INPUT MULTI-OUTPUT RESONANT REGULATING RECTIFIER

(71) Applicant: KOREA UNIVERSITY RESEARCH AND BUSINESS FOUNDATION, Seoul (KR)

(72) Inventors: Hyung-Min Lee, Seoul (KR); Hyun-Su Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 19/014,105

(22) Filed: Jan. 8, 2025

(65) Prior Publication Data

US 2025/0286471 A1      Sep. 11, 2025

(30) Foreign Application Priority Data

Mar. 7, 2024      (KR) ........................ 10-2024-0032569

(51) Int. Cl.
| | |
|---|---|
| *H02J 50/12* | (2016.01) |
| *H02M 1/08* | (2006.01) |
| *H02M 1/14* | (2006.01) |
| *H02M 7/23* | (2006.01) |

(52) U.S. Cl.
CPC .............. *H02M 7/23* (2013.01); *H02J 50/12* (2016.02); *H02M 1/08* (2013.01); *H02M 1/14* (2013.01)

(58) Field of Classification Search
CPC ............ H02M 7/23; H02M 1/08; H02M 1/14; H02M 1/008; H02M 7/217; H02M 7/219; H02M 7/483; H02M 1/009; H02M 7/064; H02J 50/12

USPC ......................................................... 307/104
See application file for complete search history.

(56) References Cited

U.S. PATENT DOCUMENTS

2022/0085653 A1 *   3/2022   Rouse ................... H02M 7/217

FOREIGN PATENT DOCUMENTS

KR       1020190125611       *   1/2021

OTHER PUBLICATIONS

Lee, Hyun-Su et al., "A 90.8%-Efficiency SIMO Resonant Regulating Rectifier Generating 3 Outputs in a Half Cycle with Distributed Multi-Phase Control for Wirelessly-Powered Implantable Devices", IEEE International Solid-State Circuits Conference, DOI: 10.1109/ISSCC49657.2024.10454403, Feb. 2024.

* cited by examiner

*Primary Examiner* — Rexford N Barnie
*Assistant Examiner* — Xuan Ly
(74) *Attorney, Agent, or Firm* — BROADVIEW IP LAW, PC

(57)      ABSTRACT

Disclosed herein is a single-input multi-output resonant regulating rectifier. The single-input multi-output resonant regulating rectifier may include: a conversion circuit unit converting a wireless power alternating current (AC) signal into half-cycle input signals $V_{INN}$ and $V_{INP}$; and an output generation circuit unit generating a plurality of outputs within a half cycle by generating a plurality of gate signals in a plurality of different regions within each half cycle based on the half-cycle input signal $V_{INN}$ input through the conversion circuit unit.

13 Claims, 13 Drawing Sheets

PULSE WIDTH MODULATION RESONANT REGULATING RECTFIER

SINGLE-INPUT MULTI-OUTPUT RESONANT REGULATING RECTIFIER

CROSS-REFERENCE TO RELATED APPLICATION

This application claims the benefit of priority under 35 U.S.C. § 119(a) to Korean Patent Application No. 10-2024-0032569, filed on Mar. 7, 2024, the entire contents of which is incorporated herein by reference.

BACKGROUND

(a) Technical Field

The present disclosure relates to a single-input multi-output resonant regulating rectifier.

(b) Background Art

Instead of a technology for supplying power to electronic devices through wires, a technology for supplying power through wireless power transfer (WPT) has emerged. A WPT system transmits and receives power through changes in magnetic field of coils at a transmitting end and a receive end. The receive end is composed of an alternating current (AC)-direct current (DC) rectifier and a DC-DC converter in a two-stage structure (see FIG. 1).

The AC-DC rectifier converts an AC voltage $V_{INN}$ into a DC voltage $V_{REC}$. In this case, $V_{REC}$ is not set to a targeted voltage value through feedback, but changes depending on a distance between the coils, an angle, and a load $R_L$. For this reason, a DC-DC converter is essentially required behind the AC-DC rectifier. Such a DC-DC converter converts an unstable DC voltage $V_{REC}$ into a stable DC voltage $V_{REG}$ through feedback. In addition, such a DC voltage $V_{REG}$ may be adjusted according to a consumer/designer's goal, and it hardly changes depending on the distance between the coils, the angle, and the load $R_L$.

A system having such a two-stage structure has several disadvantages. Among them, a first disadvantage is that power conversion efficiency is low and a voltage conversion rate is low due to two structures. In addition, there is a disadvantage that a chip size is great due to the two-stage structure.

In order to solve such problems, a resonant regulating rectifier in which a two-stage structure is reduced to a one-stage structure has been proposed (see FIG. 2). In order to convert an AC voltage into a stable and targeted DC voltage with a one-stage structure, voltage pulse width modulation (PWM) has been applied as illustrated in FIG. 3.

FIG. 4 is a diagram illustrating three one-stage structures according to the related art. In FIG. 4, $V_{REG1}$ represents a high voltage, and $V_{REG2}$ represents a low voltage. A first structure of FIG. 4 is a method of generating a dual output by bundling several outputs, and a second structure of FIG. 4 is a method of generating one output when a cycle is +cycle and the other output when a cycle is a-cycle. A third structure of FIG. 4 is a method of using an intermediate voltage required to generate a high voltage (first output) in a voltage doubler structure as a second output.

Such a related art has a disadvantage that efficiency is low when generating the low voltage $V_{REG2}$ because $V_{SG}$ of $P_4$ is small, it is difficult for a comparator to find a point in time where $V_{INN}$ and $V_{REG2}$ coincide with each other when generating the low voltage $V_{REG2}$, an output voltage ripple is great, maximum output power is small, and the number of outputs is small.

SUMMARY OF THE DISCLOSURE

The present disclosure is to provide a single-input multi-output resonant regulating rectifier.

In addition, the present disclosure is to provide a single-input multi-output resonant regulating rectifier capable of generating three outputs within a half cycle.

Further, the present disclosure is to provide a single-input multi-output resonant regulating rectifier having a low output voltage ripple and high maximum output power, and capable of selecting a multiple output mode.

Furthermore, the present disclosure is to provide a single-input multi-output resonant regulating rectifier capable of being applied to medical system on chips (SoCs) or artificial retinas requiring dynamic voltage scaling through three output modes.

According to an aspect of the present disclosure, there is provided a single-input multi-output resonant regulating rectifier.

According to an embodiment of the present disclosure, the single-input multi-output resonant regulating rectifier may include: a conversion circuit unit converting a wireless power alternating current (AC) signal into half-cycle input signals $V_{INN}$ and $V_{INP}$; and an output generation circuit unit generating a plurality of outputs within a half cycle by generating a plurality of gate signals in a plurality of different regions within each half cycle based on the half-cycle input signal $V_{INN}$ input through the conversion circuit unit.

The conversion circuit unit may include: a resonant circuit unit $L_2C_2$ receiving the wireless power AC signal; and a pair of transistors $N_1$ and $N_2$ connected to the resonant circuit unit $L_2C_2$ in parallel and cross-coupled, wherein the pair of transistors $N_1$ and $N_2$ cross-coupled may convert the wireless power AC signal input through the resonant circuit unit $L_2C_2$ into the half-cycle input signals $V_{INN}$ and $V_{INP}$.

The output generation circuit unit may include: a first output circuit unit generating a first reference signal $V_{REF,PL}$ using a signal output through the conversion circuit unit in a first region, and generating a first gate signal $V_{G,PL}$ using the half-cycle input signal $V_{INN}$ and the first reference signal $V_{REF,PL}$; a second output circuit unit generating a second reference signal $V_{REF,PC}$ using a signal output through the conversion circuit unit in a second region, and generating a second gate signal $V_{G,PC}$ using the half-cycle input signal VIN and the second reference signal $V_{REF,PC}$; and a third output circuit unit generating a third reference signal $V_{REF,PR}$ using a signal output through the conversion circuit unit in a third region, and generating a third gate signal $V_{G,PR}$ using the half-cycle input signal $V_{INN}$ and the third reference signal $V_{REF,PR}$.

The second region is a peak center region of the half cycle, the first region is any region on a left side of the peak center region, and the third region is any region on a right side of the peak center region.

Each of the first, second, and third output circuit units may include: a transistor; a reference signal generation unit receiving a signal output from the conversion circuit unit through the transistor and generating a target reference signal; and a total comparator generating a target gate signal using the half-cycle input signal $V_{INN}$ and the target reference signal, wherein the target gate signal may adjust the target reference signal to be equal to a target voltage, a source of the transistor may be connected to the conversion circuit unit and receive the half-cycle input signal $V_{INN}$, a gate of the transistor may be connected to an output terminal of the total comparator, and a drain of the transistor may be connected to an output terminal of the reference signal generation unit, the target reference signal may be any one of the first reference signal $V_{REF,PL}$, the second reference signal $V_{REF,PC}$, and the third reference signal $V_{REF,PR}$, and the target gate signal may be any one of the first gate signal $V_{G,PL}$, the second gate signal $V_{G,PC}$, and the third gate signal $V_{G,PC}$.

The total comparator included in the first output circuit unit may include: a comparator sensing a first point in time at which the half-cycle input signal $V_{INN}$ and the first reference signal become equal to each other and outputting a comparator output signal $V_{CMP,PL}$; a pulse width modulation (PWM) controller comparing the first reference signal $V_{REF,PL}$ with a target voltage $V_{TG,PL}$ to determine a delay of the comparator output signal $V_{CMP,PL}$, determining a second point in time $t_{P,PL}$ of the first gate signal $V_{G,PL}$, and adjusting the first reference signal $V_{REF,PL}$ to match with the target voltage $V_{TG,PL}$; and a driving circuit unit outputting a first gate signal that falls at the first point in time $t_{S,PL}$ and rises at the second point in time $t_{S,PL}$.

The total comparator included in the second output circuit unit may include: a comparator sensing each of a third point in time $t_{S,PC}$ and a fourth point in time $t_{E,PC}$ at which the half-cycle input signal $V_{INN}$ and the second reference signal $V_{REF,PC}$ become equal to each other and generating a comparator output signal $V_{CMP,PC}$, the comparator output signal $V_{CMP,PC}$ falling at the third point in time $t_{S,PC}$ and rising at the fourth point in time $t_{E,PC}$; a PWM controller comparing the second reference signal $V_{REF,PC}$ with a target voltage $V_{TG,PC}$ to determine a delay of the comparator output signal $V_{CMP,PC}$, determining a fifth point in time $t_{P,PC}$ for matching the second reference signal $V_{REF,PC}$ with the target voltage $V_{TG,PC}$, and generating an output signal $V_{P,PC}$ that falls at the fifth point in time $t_{P,PC}$; and a driving circuit unit receiving the comparator output signal $V_{CMP,PC}$ and the output signal $V_{P,PC}$ of the PWM controller and generating a second gate signal $V_{G,PC}$ that falls at the third point in time $t_{S,PL}$ and rises at the fifth point in time $t_{P,PC}$.

The total comparator included in the third output circuit unit may include: a comparator sensing a sixth point in time $t_{E,PR}$ at which the half-cycle input signal $V_{INN}$ and the third reference signal $V_{REF,PR}$ become equal to each other and generating a comparator output signal $V_{CMP,PR}$; a PWM controller comparing the third reference signal $V_{REF,PR}$ with a target voltage $V_{TG,PR}$ to determine a delay of the comparator output signal $V_{CMP,PC}$, determining a seventh point in time $t_{P,PR}$ at which the third gate signal $V_{G,PR}$ falls, and generating an output signal $V_{P,PR}$ adjusting the third reference signal $V_{REF,PR}$ to match with the target voltage $V_{TG,PR}$; and a driving circuit unit generating a third gate signal $V_{G,PR}$ that falls at the seventh point in time $t_{P,PR}$ and rises at the sixth point in time $t_{E,PR}$.

The PWM controller may include: an OTA circuit unit receiving the third reference signal $V_{REF,PR}$ and the target voltage $V_{TG,PR}$ and generating an output current signal $V_{OTA}$; a multiplexer $M_5$ receiving a threshold voltage and the output current signal $V_{OTA}$ of the OTA circuit unit and then outputting any one of the threshold voltage and the output current signal $V_{OTA}$; a bias determination circuit unit $N_{17}$ having a gate connected to an output of the multiplexer $M_5$, and determining a bias current by setting a bias by the output current signal $V_{OTA}$ output through the multiplexer $M_5$; and a current control pulse delay circuit unit delaying the comparator output signal $V_{CMP,PR}$ based on the bias current to generate the output signal $V_{P,PR}$ adjusting the third reference signal $V_{REF,PR}$ to match with the target voltage $V_{TG,PR}$, wherein the output current signal $V_{OTA}$ may increase when the third reference signal $V_{REF,PR}$ exceeds the target voltage $V_{TG,PR}$.

When a selection signal $S_{PR,PRE}$ of the multiplexer $M_5$ is "0", the bias determination circuit unit $N_{17}$ may be biased to the threshold voltage higher than a cut-off mode.

The driving circuit unit may include a negative threshold gate driving circuit unit setting the third gate signal $V_{G,PR}$ to a negative threshold voltage $-V_{TH}$ by charging a capacitor $C_3$ to a threshold voltage $V_{TH}$ through a charging path according to the second reference signal $V_{REF\_PC}$ when the third gate signal $V_{G,PR}$ rises and discharging the capacitor $C_3$ through a discharging path when the third gate signal $V_{G,PR}$ falls, in generating the third gate signal $V_{G,PR}$ that falls at the seventh point in time $t_{P,PR}$ and rises at the sixth point in time $t_{E,PR}$.

The third output circuit unit may set a point where the half-cycle input signal $V_{INN}$ input through the conversion circuit unit coincides with the third reference signal $V_{REF,PR}$ while decreasing as a reference starting point, and then adjust a gate width length in a left direction to generate a third gate signal $V_{G,PR}$.

The total comparator included in the third output circuit unit may further include a bridge circuit unit having an SR latch circuit unit, and receiving the comparator output signal $V_{CMP,PR}$ at an R-input terminal and receiving an end protection control signal at an S-input terminal and then generating an output signal $V_{Q,PR}$ that falls at the end protection signal and rises at the seventh point in time, and the PWM controller may delay the output signal $V_{Q,PR}$ of the bridge circuit unit to generate the output signal $V_{P,PR}$ that falls at the seventh point in time.

The PWM controller may receive the third reference signal $V_{REF,PR}$ through a positive input terminal and the target voltage $V_{TG,PR}$ through a negative input terminal in a crossed structure.

By providing the single-input multi-output resonant regulating rectifier according to an embodiment of the present disclosure, three outputs may be generated within the half cycle.

In addition, the present disclosure may have a low output voltage ripple and high maximum output power, may be capable of selecting a multiple output mode, and may be applied to medical system on chips (SoCs) or artificial retinas requiring dynamic voltage scaling through three output modes.

In addition, the present disclosure may lower a gate voltage to $-V$th when generating a low output voltage, and accordingly, allow a system to have high efficiency when generating three outputs.

DETAILED DESCRIPTION

Singular forms as used in this specification include plural forms unless the context clearly indicates otherwise. The term "composed of", "include", or the like, as used herein is not to be construed as necessarily including all of several components or several steps described herein, and it is to be construed that some of these components or steps may not be included or additional components or steps may be further included. In addition, the terms " . . . unit", "module", and the like, as used herein refer to a processing unit of at least one function or operation and may be implemented as hardware or software or a combination of hardware and software.

Hereinafter, embodiments of the present disclosure will be described in detail with reference to the accompanying drawings.

Figure 1:
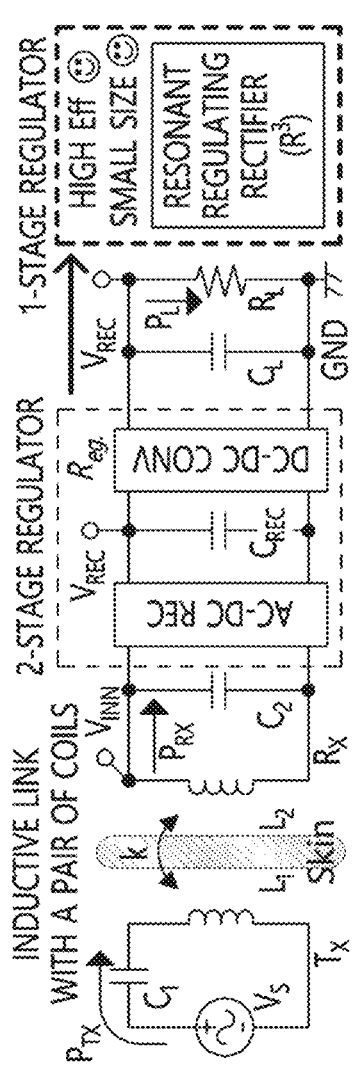
FIGS. 1 to 4 are diagrams illustrated for describing resonant regulating rectifiers according to the related art.
Figure 2:
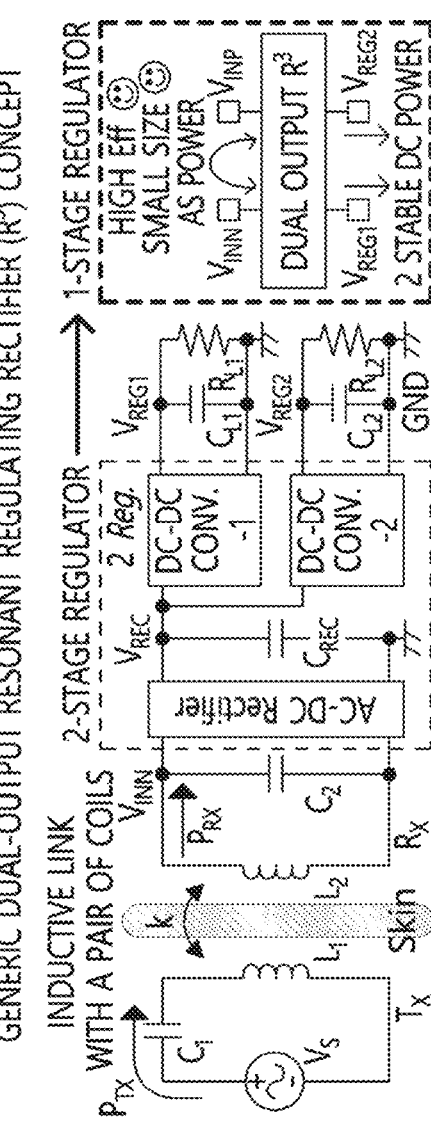
Figure 3:
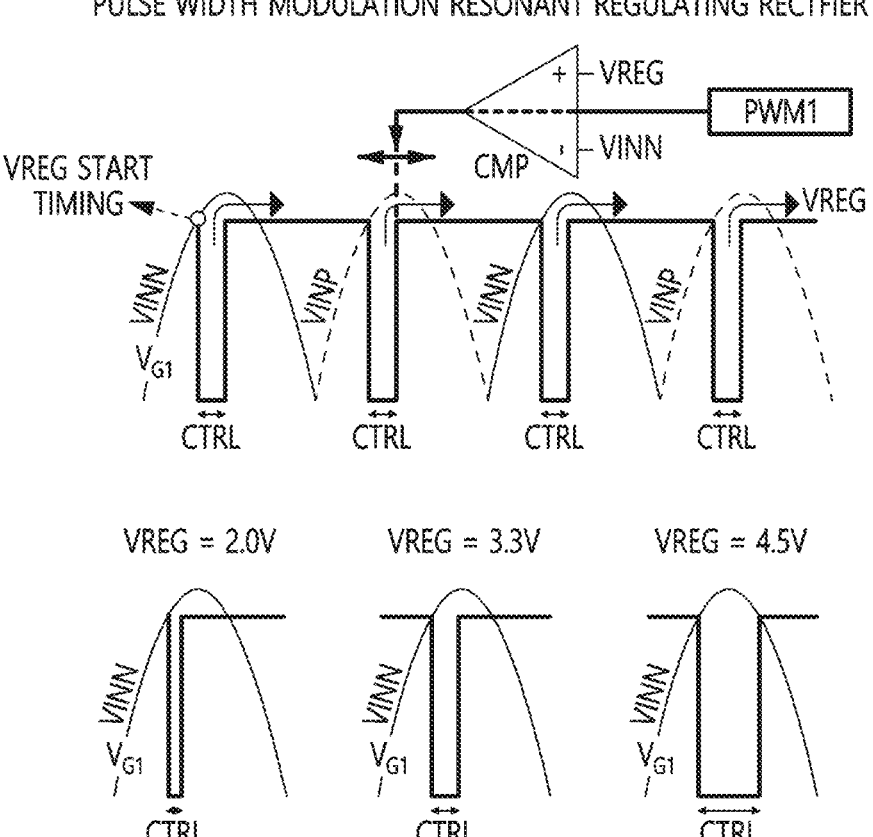
Figure 4:
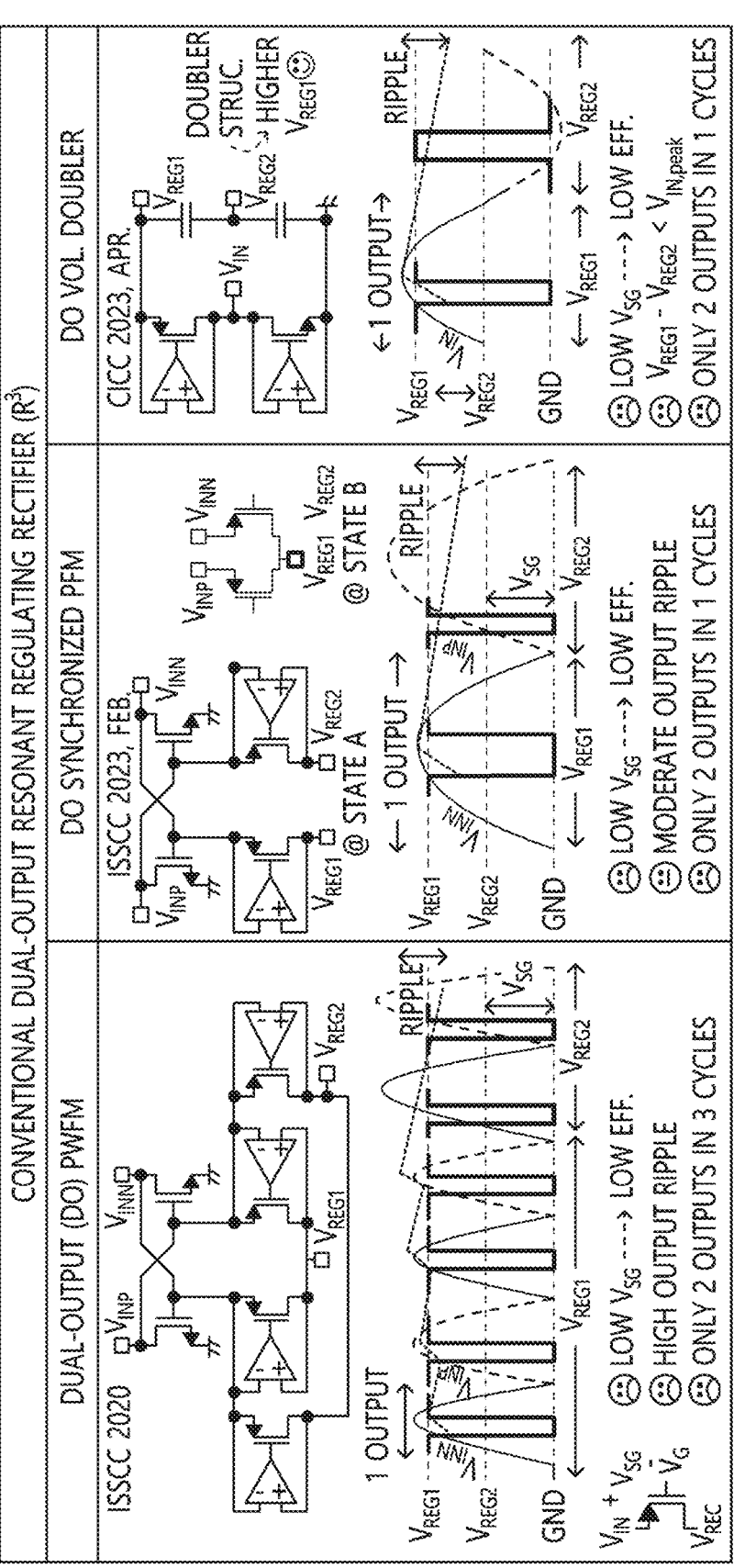
Figure 5:
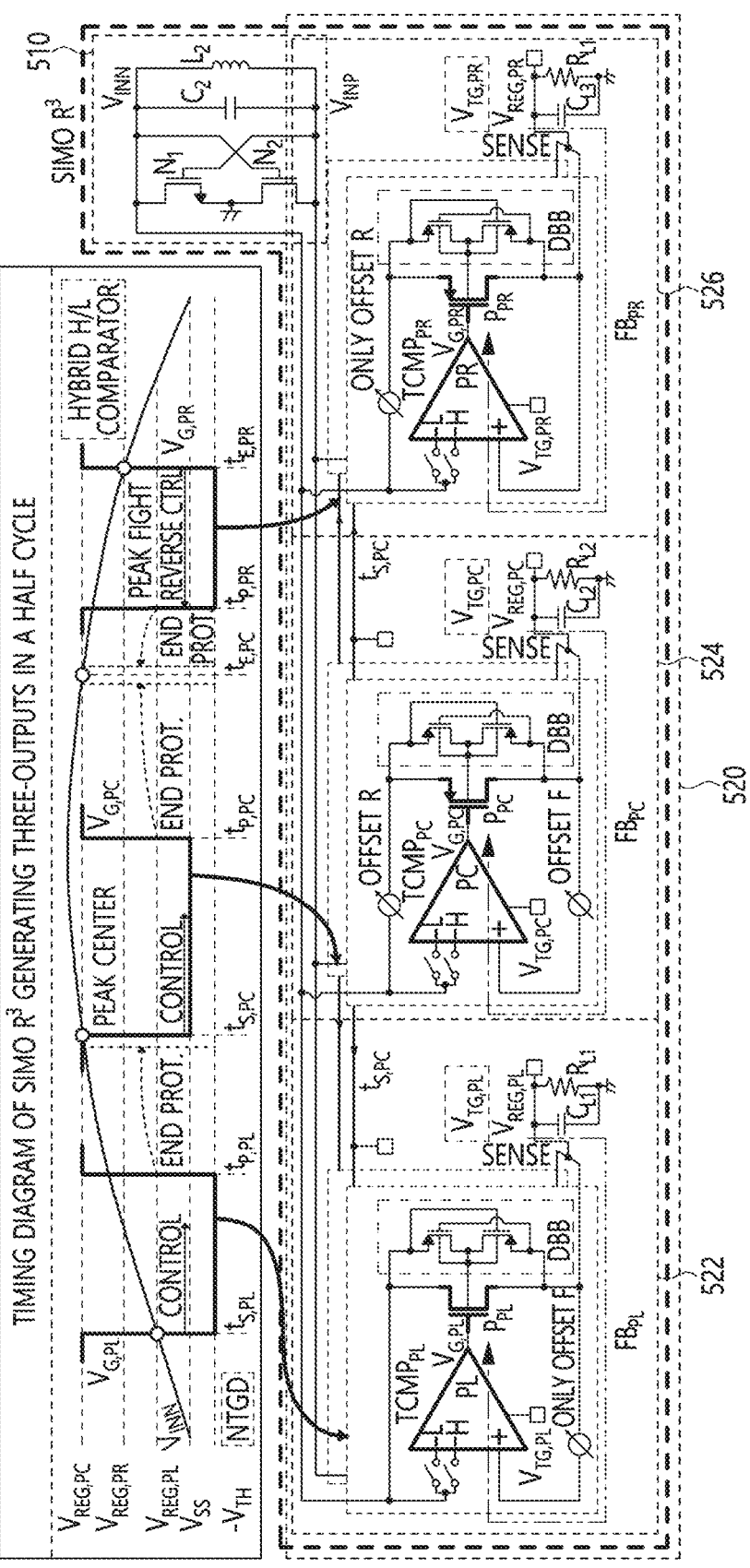
FIG. 5 is a diagram illustrating a structure of a single-input multi-output resonant regulating rectifier according to an embodiment of the present disclosure.

FIG. 5 is a diagram illustrating a structure of a single-input multi-output resonant regulating rectifier according to an embodiment of the present disclosure.

Referring to FIG. 5, the single-input multi-output resonant regulating rectifier according to an embodiment of the present disclosure is configured to include a conversion circuit unit 510 and an output generation circuit unit 520.

The conversion circuit unit 510 is configured to include a resonant circuit unit $L_2C_2$ and a pair of transistors $N_1$ and $N_2$ connected to the resonant circuit unit $L_2C_2$ in parallel and cross-coupled.

Wireless power AC transmitted from a transmitting end may be input to the resonant circuit unit $L_2C_2$. Accordingly, when the wireless power AC is input to the resonant circuit unit $L_2C_2$, the wireless power AC may be converted into half-cycle input signals $V_{INN}$ and $V_{INP}$ by the pair of transistors $N_1$ and $N_2$ connected to the resonant circuit unit $L_2C_2$ in parallel and cross-coupled.

When the wireless power AC is input to the conversion circuit unit 510, the conversion circuit unit 510 may convert the wireless power AC into a half-cycle input signal $V_{INN}$ and output the half-cycle input signal $V_{INN}$, and the half-cycle input signal $V_{INN}$ may be converted as illustrated in FIG. 5 according to the wireless power AC.

Figure 6:
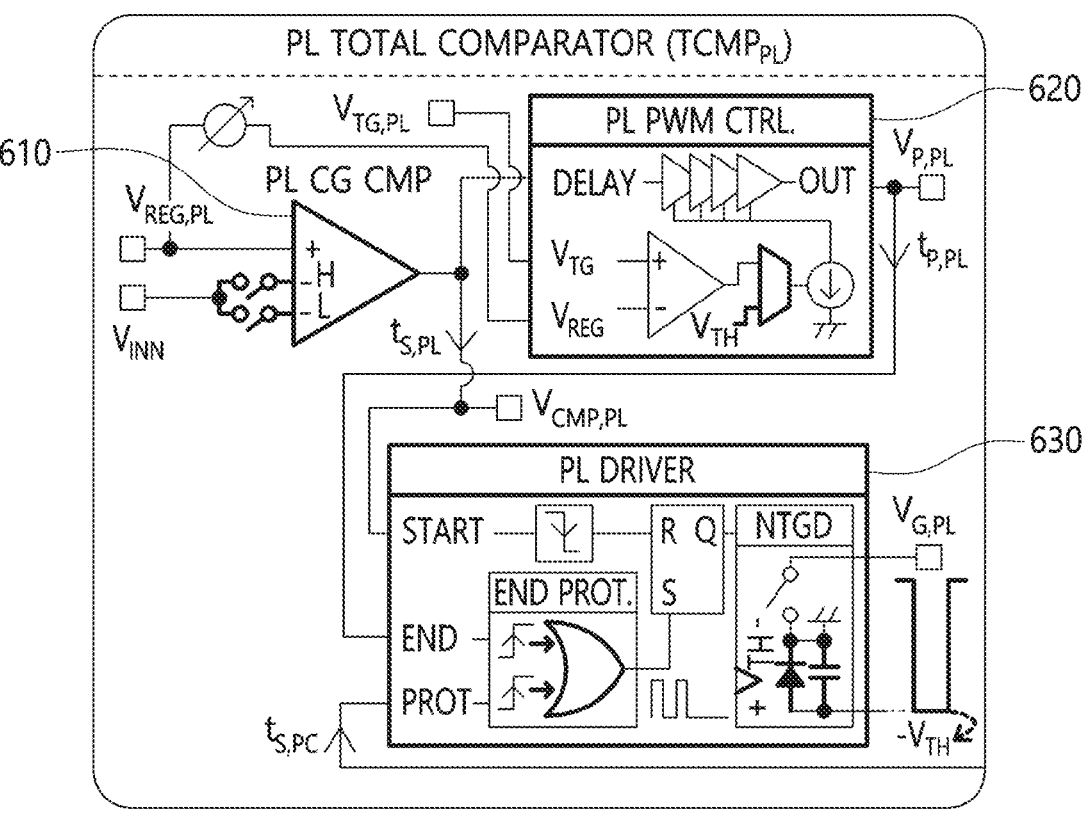
FIG. 6 is a detailed circuit diagram of a first total comparator according to an embodiment of the present disclosure.

The single-input multi-output resonant regulating rectifier according to an embodiment of the present disclosure may generate three output signals within a half-cycle input signal as illustrated in FIG. 6.

To this end, the single-input multi-output resonant regulating rectifier may generate three outputs by generating gate signals at three preset points within a half cycle in order to generate three outputs within the half-cycle input signal.

According to an embodiment of the present disclosure, the single-input multi-output resonant regulating rectifier may generate three outputs within the half cycle by generating gate signals in a peak center region (hereinafter referred to as a PC region), a left region (hereinafter referred to as a PL region) of the peak center region, and a right region (hereinafter referred to as a PR region) of the peak center region in the half-cycle input signal $V_{INN}$.

The output generation circuit unit 520 is a signal generation circuit unit for generating a plurality of gate signals in a plurality of different regions (i.e., the PL region, the PC region, and the PR region) within the half cycle based on the half-cycle input signal $V_{INN}$ input through the conversion circuit unit 510.

That is, the output generation circuit unit 520 according to an embodiment of the present disclosure may generate three gate signals within the half cycle to generate three outputs. This will be more clearly understood by the following description.

The output generation circuit unit 520 is configured to include a first output circuit unit 522, a second output circuit unit 524, and a third output circuit unit 526.

The first output circuit unit 522 is a means for generating a first reference signal $V_{REF,PL}$ using a signal input through the resonant circuit unit $L_2C_2$ in the PL region (a first region) and generating a first gate signal $V_{G,PL}$ using the half-cycle input signal $V_{INN}$ and the first reference signal $V_{REF,PL}$.

The first output circuit unit 522 is configured to include a first signal generation circuit unit $P_{PL}$ and a first total comparator 522a.

The first signal generation circuit unit PPI may generate a first reference signal $V_{REF,PL}$ by transferring power input through the resonant circuit unit $L_2C_2$ in the PL region of the half-cycle input signal $V_{INN}$ to a first reference signal generation circuit unit $C_{L1}R_{L1}$.

Here, the first signal generation circuit unit $P_{PL}$ may be implemented as a P-channel metal oxide semiconductor (PMOS). That is, a source of the first signal generation circuit unit $P_{PL}$ may be connected to one component of the conversion circuit unit to receive an output from the resonant circuit unit $L_2C_2$, and a gate of the first signal generation circuit unit PPI may be connected to an output terminal of the first total comparator 522a to receive the first gate signal $V_{G,PL}$. In addition, a drain of the first signal generation circuit unit PPI, may be connected to one end of the first reference signal generation circuit unit $C_{L1}R_{L1}$.

The first total comparator 522a may generate the first gate signal $V_{G,PL}$ based on the half-cycle input signal $V_{INN}$ transferred from the conversion circuit unit 510 and the first reference signal fed back from the first reference signal generation circuit unit $C_{L1}R_{L1}$. The first gate signal $V_{G,PL}$ may adjust the first reference signal $V_{REF,PL}$ to be equal to a target voltage $V_{TG,PL}$.

The first total comparator 522a may sense a first point in time $t_{S,PL}$ at which the half-cycle input signal $V_{INN}$ and the first reference signal $V_{REF,PL}$ become equal to each other, determine a second point in time $t_{P,PL}$ so that the first reference signal $V_{REF,PL}$ coincides with the target voltage $V_{TG,PL}$, and output the first gate signal $V_{G,PL}$ that falls at the first point in time $t_{S,PL}$ and rises at the second point in time $t_{P,PL}$.

Even though $t_{S,PL}$ is described as the first point in time in a context in the present specification, the first point in time may generate a first synchronization signal. Accordingly, even though $t_{S,PL}$ is described as the first point in time in the context, it should be widely construed to include the first synchronization signal, and this should also be widely construed at each point in time.

A detailed circuit diagram of the first total comparator $522a$ is illustrated in FIG. 6.

Referring to FIG. 6, the first total comparator $522a$ is configured to include a comparator 610, a pulse width modulation (PWM) controller 620, and a driving circuit unit 630.

The comparator 610 may sense the first point in time $t_{S,PL}$ at which the half-cycle input signal $V_{INN}$ and the fed-back first reference signal $V_{REF,PL}$ become equal to each other, and output a comparator output signal $V_{CMP,PL}$. That is, the comparator output signal $V_{CMP,PL}$, which is an output of the comparator 610, may fall at the first point in time $t_{S,PL}$, and the first point in time $t_{S,PL}$ at which the half-cycle input signal $V_{INN}$ and the first reference signal $V_{REF,PL}$ become equal to each other may be accurately sensed by applying an offset-controlled front (TCAS-1, 2011) technology.

The PWM controller 620 may compare the first reference signal $V_{REF,PL}$ with the target voltage $V_{TG,PL}$ to determine a delay of the comparator output signal $V_{CMP,PL}$, and generate an output $V_{P,PL}$ that falls at a second point in time $t_{P,PL}$.

The driving circuit unit 630 may receive the output $V_{P,PL}$ of the PWM controller 620 and the output (comparator output signal $V_{CMP,PL}$) of the comparator 610 and generate the first gate signal $V_{G,PL}$ that falls at a first point in time $t_{S,PL}$ and rises at a second point in time $t_{P,PL}$.

In addition, the driving circuit unit 630 includes a negative threshold gate driving circuit unit NTGD. The first gate signal $V_{G,PL}$ may be set to a negative threshold voltage $-V_{TH}$ instead of a ground GND by using the negative threshold gate driving circuit unit NTGD. This will be described in more detail below.

As described above, in the first output circuit unit 522, the first reference signal $V_{REF,PL}$ may be adjusted to be equal to the target voltage $V_{TG,PL}$ through a feedback path composed of the comparator 610, the PWM controller 620, and the driving circuit unit 630.

The second output circuit unit 524 is a means for generating an output signal in a second region (PC region) of the half-cycle input signal $V_{INN}$.

The second output circuit unit 524 may generate a second reference signal $V_{REF,PC}$ using a signal output through the conversion circuit unit 510, and may generate a second gate signal $V_{G,PC}$ using the half-cycle input signal $V_{INN}$ and the second reference signal $V_{REF,PC}$.

This will be described in more detail.

The second output circuit unit 524 is configured to include a second signal generation circuit unit $P_{PC}$ and a second total comparator 524a.

The second signal generation circuit unit $P_{PC}$ may generate a second reference signal $V_{REF,PC}$ by transferring power input through the resonant circuit unit $L_2C_2$ in the PC region of the half-cycle input signal $V_{INN}$ to a second reference signal generation circuit unit $C_{L2}R_{L2}$.

The second total comparator 524a may generate the second gate signal $V_{G,PC}$ based on the half-cycle input signal $V_{INN}$ transferred from the conversion circuit unit 510 and the second reference signal $V_{REF,PC}$ fed back from the second reference signal generation circuit unit $C_{L2}R_{L2}$. The second gate signal $V_{G,PC}$ may adjust a target voltage $V_{TG,PC}$ to be equal to the second reference signal $V_{REF,PC}$.

Figure 7:
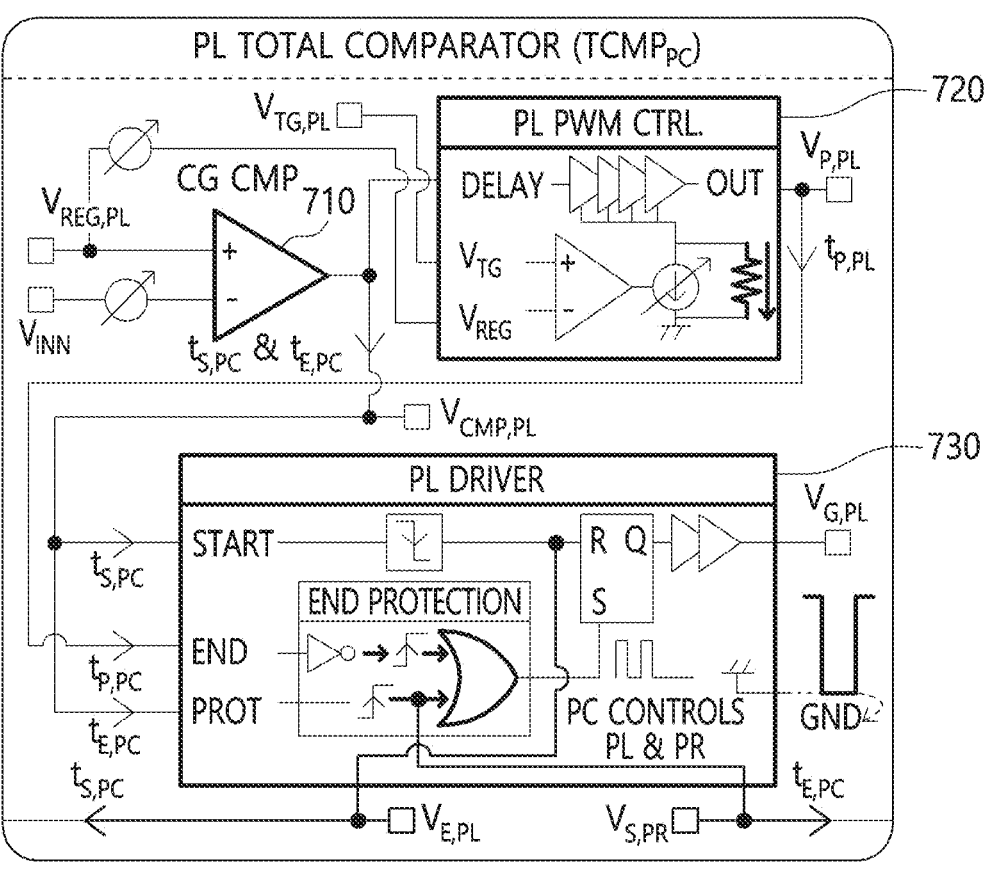
FIG. 7 is a detailed circuit diagram of a second total comparator according to an embodiment of the present disclosure.

A detailed circuit diagram of the second total comparator 524a is illustrated in FIG. 7.

Referring to FIG. 7, the second total comparator 524a is configured to include a comparator 710, a PWM controller 720, and a driving circuit unit 730.

The comparator 710 may receive the second reference signal $V_{REF,PC}$ at a first input terminal (+ terminal), receive the half-cycle input signal $V_{INN}$ at a second input terminal (– terminal), and may then sense a third point in time $t_{S,PC}$ and a fourth point in time $t_{E,PC}$ at which the half-cycle input signal $V_{INN}$ becomes identical to the second reference signal $V_{REF,PC}$.

An output signal $V_{CMP,PC}$ of the comparator 710 may fall at the third point in time $t_{S,PC}$ and rise at the fourth point in time $t_{E,PC}$.

The PWM controller 720 may receive the second reference signal $V_{REF,PC}$, the target voltage $V_{TG,PC}$, and the comparator output signal $V_{CMP,PC}$, and then may compare the second reference signal $V_{REF,PC}$ with the target voltage $V_{TG,PC}$ to determine a delay of the comparator output signal $V_{CMP,PC}$ and generate an output $V_{P,PC}$ that falls at a fifth point in time $t_{P,PL}$.

The driving circuit unit 730 may receive the comparator output signal $V_{CMP,PC}$ and the output $V_{P,PC}$ of the PWM controller 720, and then generate the second gate signal $V_{G,PC}$ that falls at a third point in time $t_{S,PC}$ and rises at a fifth point in time $t_{P,PL}$.

In addition, the driving circuit unit 730 may limit the fifth point in time $t_{P,PL}$ to the fourth point in time $t_{E,PC}$, generate a first end-protection signal $V_{E,PL}$ rising at the third point in time $t_{S,PC}$, and generate a second end-protection signal $V_{S,PR}$ rising at the fourth point in time $t_{E,PC}$.

Here, the first end-protection signal $V_{E,PL}$ may operate as an end point protection signal of the first total comparator 522a, and the second end-protection signal $V_{S,PR}$ may operate as an end point protection signal of the third total comparator 526a. Through this, the second reference signal $V_{REF,PC}$ may be regulated to the target voltage $V_{TG,PC}$.

The third output circuit unit 526 is a means for generating an output in the PR region (third region).

That is, the third output circuit unit 526 may generate a third reference signal $V_{REF,PR}$ using a signal output through the conversion circuit unit 510 in the third region, and may generate a third gate signal $V_{G,PR}$ using the half-cycle input signal $V_{INN}$ and the third reference signal $V_{REF,PR}$.

The third output circuit unit 526 is configured to include a third signal generation circuit unit $P_{PR}$ and a third total comparator 526a.

The third signal generation circuit unit $P_{PR}$ may generate a third reference signal $V_{REG,PR}$ by transferring power input through the resonant circuit unit $L_2C_2$ in the PR region of the half-cycle input signal $V_{INN}$ to a third reference signal generation circuit unit $C_{L3}R_{L3}$.

The third total comparator 526a may generate the third gate signal $V_{G,PR}$ based on the half-cycle input signal $V_{INN}$ transferred from the conversion circuit unit 510 and the third reference signal $V_{REF,PR}$ fed back from the third reference signal generation circuit unit $C_{L3}R_{L3}$. The third gate signal $V_{G,PR}$ may adjust the third reference signal $V_{REF,PR}$ to be equal to a target voltage $V_{TG,PR}$.

Figure 8:
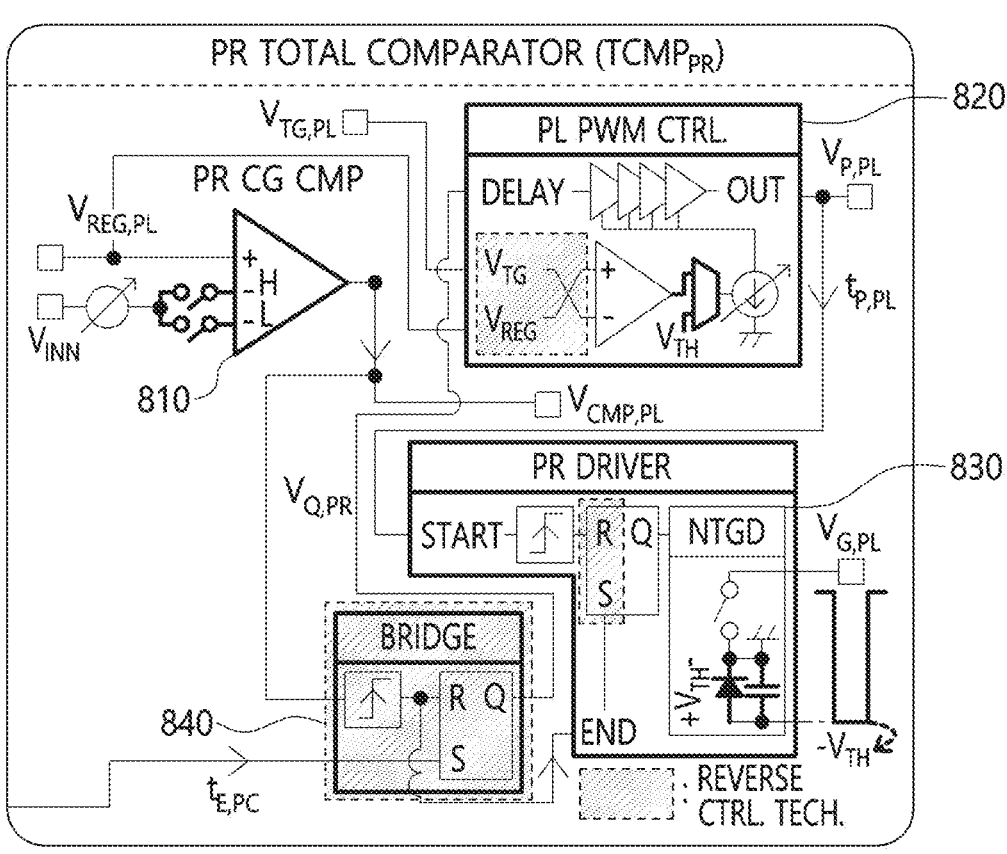
FIG. 8 is a detailed circuit diagram of a third total comparator according to an embodiment of the present disclosure.

More specifically, as illustrated in FIG. 8, the third total comparator 526a is configured to include a comparator 810, a PWM controller 820, and a driving circuit unit 830.

The comparator 810 may receive the third reference signal $V_{REF,PR}$ and the half-cycle input signal $V_{INN}$, and then widely and accurately sense a rise time of the third gate signal $V_{G,PR}$. To this end, the comparator 810 may sense a sixth point in time $t_{E,PR}$ at which the half-cycle input signal $V_{INN}$ and the third reference signal $V_{REF,PR}$ become equal to each other, and generate a comparator output signal $V_{CMP,PR}$.

The PWM controller 820 may compare the third reference signal $V_{REF,PR}$ with the target voltage $V_{TG,PR}$ to determine a delay of the comparator output signal $V_{CMP,PR}$, determine a seventh point in time $t_{P,PR}$ at which the third gate signal $V_{G,PR}$ falls, and generate an output signal $V_{P,PR}$ adjusting the third reference signal $V_{REF,PR}$ to match with the target voltage $V_{TG,PR}$. Here, the seventh point in time $t_{P,PR}$ may be limited by the fourth point in time $t_{E,PC}$ (more specifically, the second end-protection signal $V_{S,PR}$) provided from the second total comparator 524a.

In addition, the PWM controller 820 may receive the target voltage $V_{TG,PR}$ and the third reference signal $V_{REF,PR}$ input in a crossed structure compared to the first total comparator 522a and the second total comparator 524a in order to implement reverse control.

For example, a comparator 610 inside the PWM controller 620 of the first total comparator 522a may receive the target voltage $V_{TG,PL}$ at a + input terminal, and receive the third reference signal $V_{REF,PR}$ at a-input terminal. On the other hand, a comparator 810 inside the PWM controller 820 may receive the target voltage $V_{TG,PR}$ at a-input terminal and the third reference signal $V_{REF,PR}$ at a + input terminal in a crossed structure in order to implement the reverse control.

Figure 9:
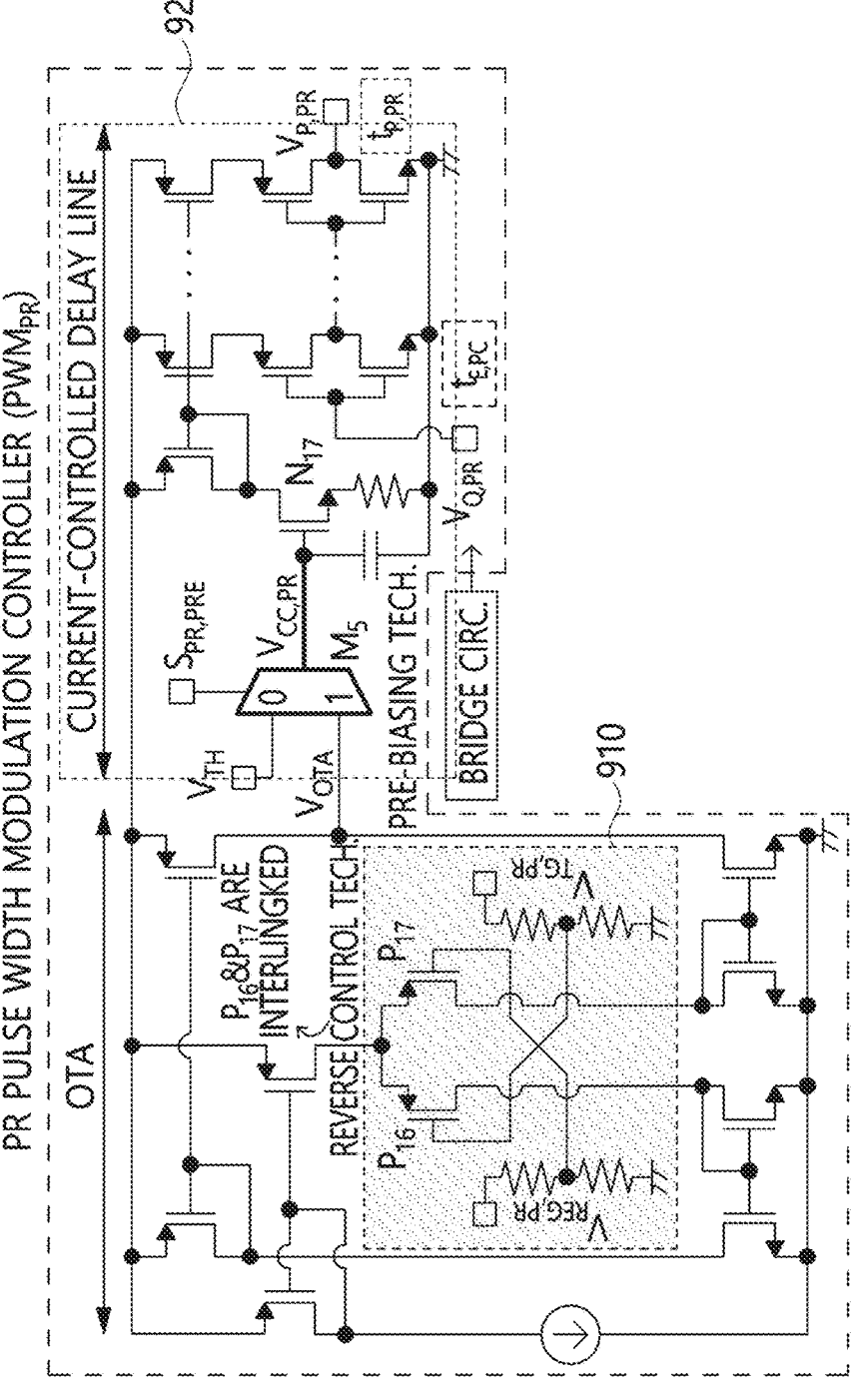
FIG. 9 is a detailed circuit diagram of a pulse width modulation (PWM) controller according to an embodiment of the present disclosure.

A detailed circuit diagram of the PWM controller 820 is illustrated in FIG. 9.

Referring to FIG. 9, an operation of the PWM controller 820 will be described in more detail.

The PWM controller 820 may determine the seventh point in time $t_{P,PR}$, which is a pulse width falling point in time of the third gate signal $V_{G,PR}$, and adjust the third reference signal $V_{REF,PR}$ to match with the target voltage $V_{TG,PR}$.

Referring to FIG. 9, the PWM controller 820 is configured to include an OTA circuit unit 910 and a current control delay circuit unit 920.

Figure 10:
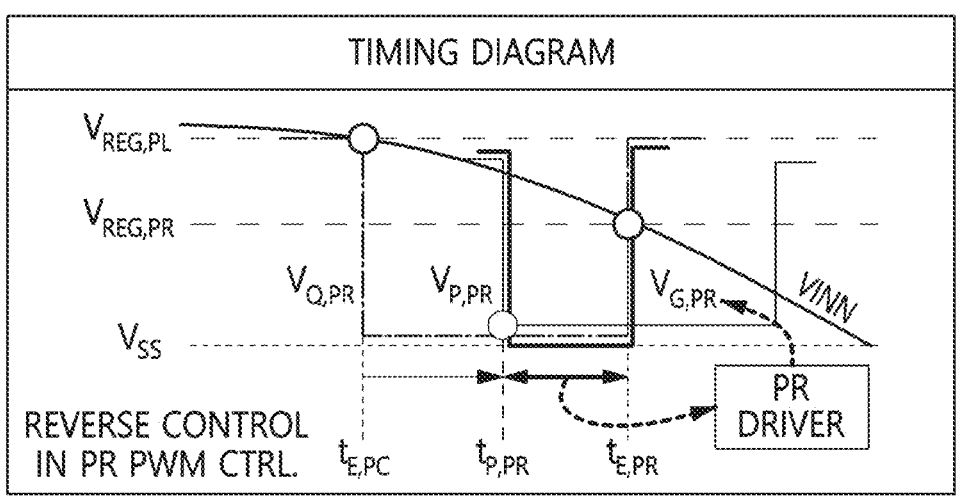
FIGS. 10 and 11 are diagrams illustrated for describing reverse control according to an embodiment of the present disclosure.

The OTA circuit unit 910 receives the target voltage $V_{TG,PR}$ and the third reference signal $V_{REF,PR}$ using a transistor $P_{16}$ and a transistor $P_{17}$ and generates an output $V_{OTA}$. As illustrated in FIG. 10, unlike the PWM controller 620 and the PWM controller 720 of the first and second total comparators 522a and 524a, the target voltage $V_{TG,PR}$ and the third reference signal $V_{REF,PR}$ may be cross-connected in order to implement the reverse control. For this reason, when the third reference signal $V_{REF,PR}$ exceeds the target voltage $V_{TG,PR}$, the output $V_{OTA}$ of the OTA circuit unit 910 increases.

The output $V_{OTA}$ of the OTA circuit unit 910 is input to a multiplexer $M_5$ inside the current control delay circuit unit 920. An output terminal $V_{CC,PR}$ of the multiplexer $M_5$ is connected to a gate of the transistor $N_{17}$. For this reason, when a selection signal $S_{PR,PRE}$ of the multiplexer $M_5$ is 1, a bias of the gate of the transistor $N_{17}$ may be set by the output $V_{OTA}$ of the OTA circuit unit 910 to determine a bias current of the current control delay circuit unit 920 and adjust the third reference signal $V_{REF,PR}$ to match with the target voltage $V_{TG,PR}$.

In addition, the current control delay circuit unit 920 may delay an output signal $V_{O,PR}$ of a bridge circuit unit 840 to generate an output $V_{P,PR}$ that falls at the seventh point in time $t_{P,PR}$.

The fourth point in time $t_{E,PC}$, which is a falling point in time of the output signal $V_{O,PR}$ of the bridge circuit unit 840, more specifically, the second end-protection signal $V_{S,PR}$ may be delayed to the seventh point in time $t_{P,PR}$, which is a falling point in time of an output signal $V_{P,PR}$ of the current control delay circuit unit 920 (see FIG. 10).

The driving circuit unit 830 may generate the third gate signal $V_{G,PR}$ that falls at the seventh point in time $t_{P,PR}$ and rises at the sixth point in time $t_{E,PR}$.

That is, the third total comparator 526a may implement the reverse control in a manner of delaying the fourth point in time $t_{E,PC}$ to the seventh point in time $t_{P,PR}$ and subtracting the fourth point in time $t_{E,PC}$ from the seventh point in time $t_{P,PR}$.

This will be described in more detail with reference to FIG. 11.

Figure 11:
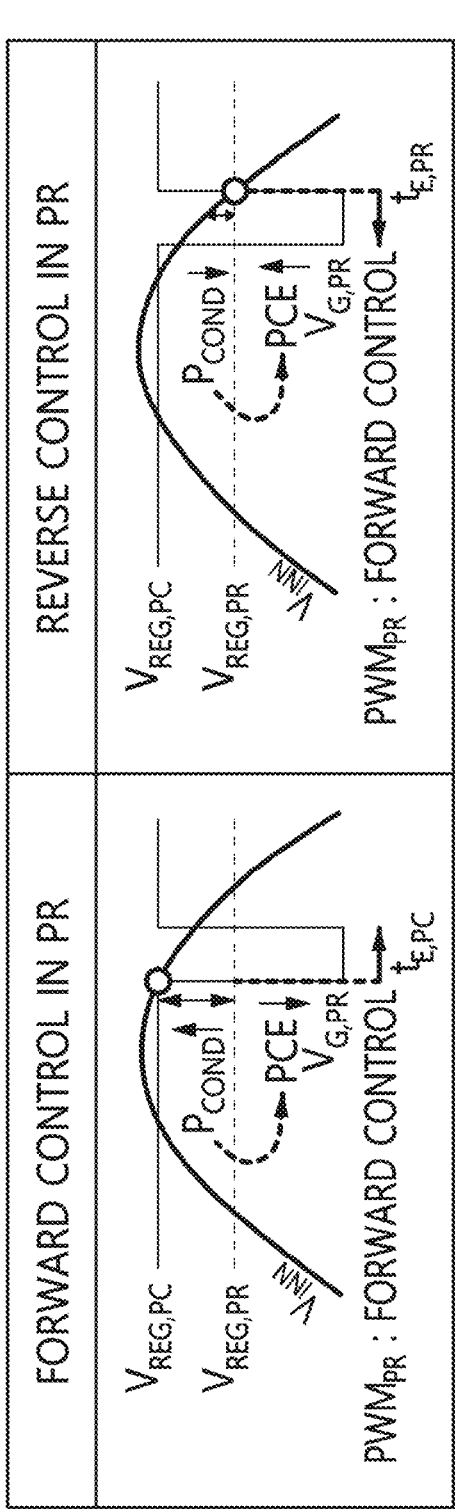

As illustrated in FIG. 11, when forward control is implemented in the third total comparator 526a, the PWM controller 820 determines a width of the third gate signal $V_{G,PR}$ from the fourth point in time $t_{E,PC}$. However, this has a disadvantage that high conduction loss is caused in the third signal generation circuit unit $P_{PR}$ due to a great difference between the half-cycle input signal $V_{INN}$ and the third reference signal $V_{REF,PR}$, which results in a decrease in power conversion efficiency (PCE).

However, as in an embodiment of the present disclosure, through the reverse control, the PWM controller 820 may determine a width of the third reference signal $V_{REF,PR}$ from the sixth point in time $t_{E,PR}$ and reduce a gap between the half-cycle input signal $V_{INN}$ and the third reference signal $V_{REF,PR}$ to increase the power conversion efficiency.

In addition, the third total comparator 526a may bias the transistor $N_{17}$ to be slightly higher than a cut-off mode by setting an output signal $V_{CC,PR}$ of the multiplexer $M_5$ to a threshold voltage $V_{TH}$ when the selection signal $S_{PR,PRE}$ of the multiplexer $M_5$ is 0. For this reason, when the selection signal $S_{PR,PRE}$ of the multiplexer $M_5$ changes to 1, the $S_{PR,PRE}$ of the multiplexer $M_5$ may be smoothly switched in a process of changing to the output signal $V_{OTA}$ of the OTA circuit unit 910.

The driving circuit unit 830 also requires cross-connection in order to implement reverse control. The driving circuit unit 830 generate the third gate signal $V_{G,PR}$ that falls at the seventh point in time $t_{P,PR}$ and rises at the sixth point in time $t_{E,PR}$.

The driving circuit unit 830 may have a negative threshold gate driving circuit unit NTGD, and the third gate signal $V_{G,PR}$ may be lowered below a negative threshold voltage $-V_{TH}$ by the negative threshold gate driving circuit unit NTGD.

Figure 13:
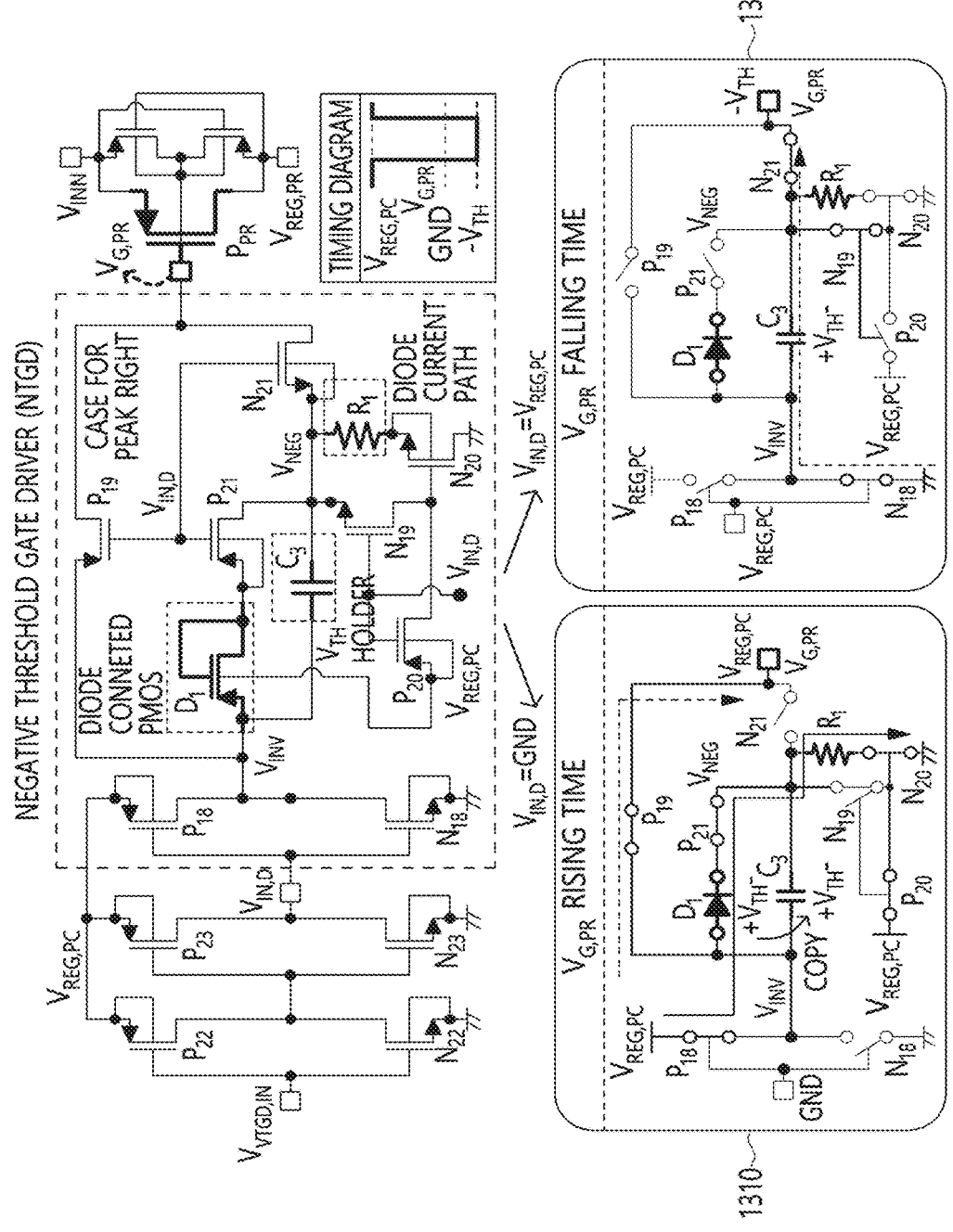
FIG. 13 is a detailed circuit diagram of a negative threshold gate driving circuit unit according to an embodiment of the present disclosure.

Referring to FIG. 13, when an initial gate signal (e.g., $V_{G,PR}$) rises, an output line of the third gate signal $V_{G,PR}$ may be connected to an input line of the second reference signal $V_{REG,PC}$ as represented by reference number 1310. For this reason, a transistor $P_{PR}$ may be set to a turn-off state.

An input terminal of the second reference signal $V_{REF,PC}$ is connected to a source terminal of a transistor $P_{18}$, the transistor $P_{18}$ is turned on by the second reference signal $V_{REF,PC}$, the second reference signal $V_{REF,PC}$ is transferred to a first diode $D_1$ through a $V_{INV}$ contact node connected to a drain terminal of the transistor $P_{18}$, a transistor $P_{21}$ having a source terminal connected to an output terminal of the first diode $D_1$ is turned on, and the second reference signal $V_{REF,PC}$ is transferred to a ground through a resistor $R_1$ having one end connected to a VNEG contact node through a drain terminal of the transistor $P_{21}$.

In addition, a threshold voltage $V_{TH}$ of the first diode $D_1$ is copied from the $V_{INV}$ contact node to a capacitor $C_3$ connected to the first diode $D_1$ in parallel, such that the capacitor $C_3$ is charged to a threshold voltage level.

In other words, when the initial third gate signal $V_{G,PR}$ rises, the second reference signal $V_{REF,PC}$ flows to a ground through a first path to the transistor $P_{18}$, the first diode $D_1$, the transistor $P_{21}$, and the resistor $R_1$, and through this process, the capacitor $C_3$ connected to the first diode $D_1$ in parallel is charged to the threshold voltage $V_{TH}$ level.

On the other hand, when the third gate signal $V_{G,PR}$ falls, the transistor $P_{18}$ is turned off and the transistor $P_{21}$ is also turned off, a transistor $N_{18}$ is turned on, a transistor $N_{21}$ to which the other end of the capacitor $C_3$ is connected is turned on, and the capacitor $C_3$ is discharged, such that the third gate signal $V_{G,PR}$ may be set to a negative threshold voltage-$V_{TH}$.

In other words, when the third gate signal $V_{G,PR}$ falls, the capacitor $C_3$ is discharged through a second path 1320 (see FIG. 13) to the transistor $N_{18}$, the capacitor $C_3$, and the transistor $N_{21}$, such that the third gate signal $V_{G,PR}$ may be set to a negative threshold voltage $-V_{TH}$. Through this, the third gate signal $V_{G,PR}$ may be set between the second reference signal $V_{REF,PC}$ and the negative threshold voltage $-V_{TH}$.

A feedback circuit unit of the third total comparator 526a is composed of the comparator 810, the PWM controller 820, and the driving circuit unit 830, through which the third reference signal $V_{REF,PR}$ may be adjusted to be equal to the target voltage $V_{TG,PR}$.

Figure 12:
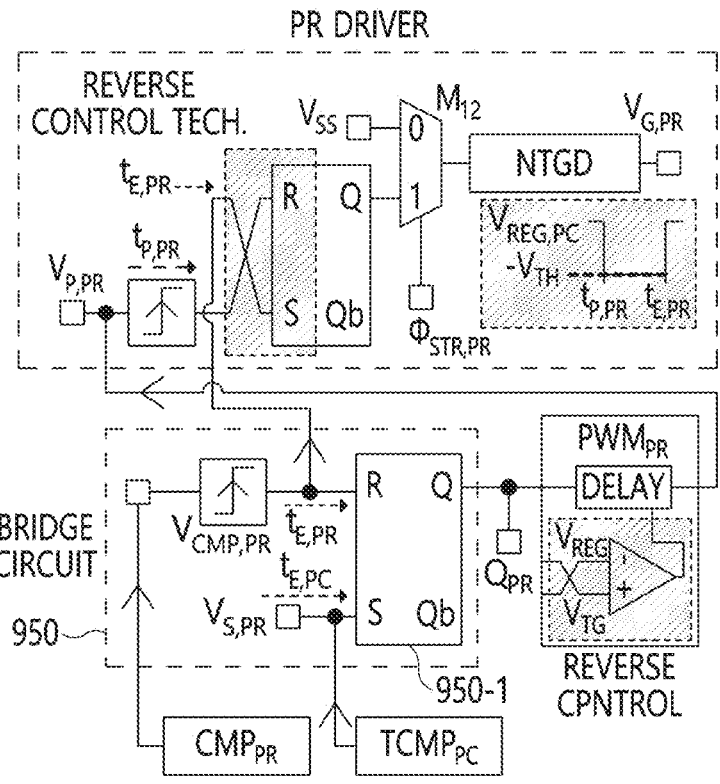
FIG. 12 is a detailed circuit diagram of a driving circuit unit and a bridge circuit unit according to an embodiment of the present disclosure.

A circuit diagram of the driving circuit unit 830 and a circuit diagram of the bridge circuit unit 840 are illustrated in FIG. 12.

The bridge circuit unit 840 is composed of an SR latch circuit unit 840-1. The SR latch circuit unit 840-1 may receive the comparator output signal $V_{CMP,PR}$ provided from the third total comparator 526a at an R-input terminal, receive the second end-protection signal $V_{S,PR}$ provided from the second total comparator 524a at an S-input terminal, and then may generate an output signal $V_{Q,PR}$ that falls at the fourth point in time $t_{E,PC}$ and rises at the seventh point in time $t_{P,PR}$.

Subsequently, the output signal $V_{Q,PR}$ of the bridge circuit unit 840 may pass through the PWM controller 820 and be used to generate an output signal $V_{P,PR}$ of the PWM controller 820 that falls at the seventh point in time $t_{P,PR}$.

The embodiments of the present disclosure have been mainly described hereinabove. It will be understood by those skilled in the art to which the present disclosure pertains that the present disclosure may be implemented in a modified form without departing from essential characteristics of the present disclosure. Therefore, the embodiments disclosed herein should be considered in an illustrative aspect rather than a restrictive aspect. The scope of the present disclosure should be defined by the claims rather than the above description, and all differences within the scope equivalent to the claims should be interpreted to fall within the present disclosure.

What is claimed is:

1. A single-input multi-output resonant regulating rectifier, comprising:
   a conversion circuit unit converting a wireless power alternating current (AC) signal into half-cycle input signals $V_{INN}$ and $V_{INP}$; and
   an output generation circuit unit generating a plurality of outputs within a half cycle by generating a plurality of gate signals in a plurality of different regions within each half cycle based on the half-cycle input signal $V_{INN}$ input through the conversion circuit unit,
   wherein the output generation circuit unit includes:
   a first output circuit unit generating a first reference signal $V_{REF,PL}$ using a signal output through the conversion circuit unit in a first region, and generating a first gate signal $V_{G,PL}$ using the half-cycle input signal $V_{INN}$ and the first reference signal $V_{REE,PL}$;
   a second output circuit unit generating a second reference signal $V_{REE,PC}$ using a signal output through the conversion circuit unit in a second region, and generating a second gate signal $V_{G,PC}$ using the half-cycle input signal $V_{INN}$ and the second reference signal $V_{REE,PC}$; and
   a third output circuit unit generating a third reference signal $V_{REE,PR}$ using a signal output through the conversion circuit unit in a third region, and generating a third gate signal $V_{G,PR}$ using the half-cycle input signal $V_{INN}$ and the third reference signal $V_{REE,PR}$.

2. The single-input multi-output resonant regulating rectifier of claim 1,
   wherein the conversion circuit unit includes:
   a resonant circuit unit $L_2C_2$ receiving the wireless power AC signal; and
   a pair of transistors $N_1$ and $N_2$ connected to the resonant circuit unit $L_2C_2$ in parallel and cross-coupled, wherein the pair of transistors $N_1$ and $N_2$ cross-coupled converts the wireless power AC signal input through the resonant circuit unit $L_2C_2$ into the half-cycle input signals $V_{INN}$ and $V_{INP}$.

3. The single-input multi-output resonant regulating rectifier of claim 1, wherein the second region is a peak center region of the half cycle,
   the first region is any region on a left side of the peak center region, and
   the third region is any region on a right side of the peak center region.

4. The single-input multi-output resonant regulating rectifier of claim 1, wherein each of the first, second, and third output circuit units includes:
   a transistor;
   a reference signal generation unit receiving a signal output from the conversion circuit unit through the transistor and generating a target reference signal; and
   a total comparator generating a target gate signal using the half-cycle input signal $V_{INN}$ and the target reference signal,
   wherein the target gate signal adjusts the target reference signal to be equal to a target voltage,
   a source of the transistor is connected to the conversion circuit unit and receives the half-cycle input signal $V_{INN}$, a gate of the transistor is connected to an output terminal of the total comparator, and a drain of the transistor is connected to an output terminal of the reference signal generation unit,
   the target reference signal is any one of the first reference signal $V_{REF,PL}$, the second reference signal $V_{REF,PC}$, and the third reference signal $V_{REF,PR}$, and
   the target gate signal is any one of the first gate signal $V_{G,PL}$, the second gate signal $V_{G,PC}$, and the third gate signal $V_{G,PR}$.

5. The single-input multi-output resonant regulating rectifier of claim 4, wherein the total comparator included in the first output circuit unit includes:
   a comparator sensing a first point in time $t_{S,PL}$ at which the half-cycle input signal $V_{INN}$ and the first reference signal $V_{REE,PL}$ become equal to each other and outputting a comparator output signal $V_{CMP,PL}$;
   a pulse width modulation (PWM) controller comparing the first reference signal $V_{REF,PL}$ with a target voltage $V_{TG,PL}$ to determine a delay of the comparator output signal $V_{CMP,PL}$, determining a second point in time $t_{P,PL}$ of the first gate signal $V_{G,PL}$, and adjusting the first reference signal $V_{REF,PL}$ to match with the target voltage $V_{TG,PL}$; and
   a driving circuit unit outputting the first gate signal $V_{G,PL}$ that falls at the first point in time $t_{S,PL}$ and rises at the second point in time $t_{P,PL}$.

6. The single-input multi-output resonant regulating rectifier of claim 4, wherein the total comparator included in the second output circuit unit includes:

a comparator sensing each of a third point in time $t_{S,PC}$ and a fourth point in time $t_{E,PC}$ at which the half-cycle input signal $V_{INN}$ and the second reference signal $V_{REF,PC}$ become equal to each other and generating a comparator output signal $V_{CMP,PC}$, the comparator output signal $V_{CMP,PC}$ falling at the third point in time $t_{S,PC}$ and rising at the fourth point in time $t_{E,PC}$;

a pulse width modulation (PWM) controller comparing the second reference signal $V_{REF,PC}$ with a target voltage $V_{TG,PC}$ to determine a delay of the comparator output signal $V_{CMP,PC}$, determining a fifth point in time $t_{P,PC}$ for matching the second reference signal $V_{REF,PC}$ with the target voltage $V_{TG,PC}$, and generating an output signal $V_{P,PC}$ that falls at the fifth point in time $t_{P,PC}$; and a driving circuit unit receiving the comparator output signal $V_{CMP,PC}$ and the output signal $V_{P,PC}$ of the PWM controller and generating the second gate signal $V_{G,PC}$ that falls at the third point in time $t_{S,PL}$ and rises at the fifth point in time $t_{P,PC}$.

7. The single-input multi-output resonant regulating rectifier of claim 4, wherein the total comparator included in the third output circuit unit includes:

a comparator sensing a sixth point in time $t_{E,PR}$ at which the half-cycle input signal $V_{INN}$ and the third reference signal $V_{REF,PR}$ become equal to each other and generating a comparator output signal $V_{CMP,PR}$;

a pulse width modulation (PWM) controller comparing the third reference signal $V_{REF,PR}$ with a target voltage $V_{TG,PR}$ to determine a delay of the comparator output signal $V_{CMP,PR}$, determining a seventh point in time $t_{P,PR}$ at which the third gate signal $V_{G,PR}$ falls, and generating an output signal $V_{P,PR}$ adjusting the third reference signal $V_{REF,PR}$ to match with the target voltage $V_{TG,PR}$; and a driving circuit unit generating the third gate signal $V_{G,PR}$ that falls at the seventh point in time $t_{P,PR}$ and rises at the sixth point in time $t_{E,PR}$.

8. The single-input multi-output resonant regulating rectifier of claim 7, wherein the PWM controller includes:

an OTA circuit unit receiving the third reference signal $V_{REE,PR}$ and the target voltage $V_{TG,PR}$ and generating an output current signal $V_{OTA}$;

a multiplexer $M_5$ receiving a threshold voltage and the output current signal $V_{OTA}$ of the OTA circuit unit and then outputting any one of the threshold voltage and the output current signal $V_{OTA}$;

a bias determination circuit unit $N_{17}$ having a gate connected to an output of the multiplexer $M_5$, and determining a bias current by setting a bias by the output current signal $V_{OTA}$ output through the multiplexer $M_5$; and a current control pulse delay circuit unit delaying the comparator output signal $V_{CMP,PR}$ based on the bias current to generate the output signal $V_{P,PR}$ adjusting the third reference signal $V_{REF,PR}$ to match with the target voltage $V_{TG,PR}$, wherein the output current signal $V_{OTA}$ increases when the third reference signal $V_{REF,PR}$ exceeds the target voltage $V_{TG,PR}$.

9. The single-input multi-output resonant regulating rectifier of claim 8, wherein when a selection signal $S_{PR,PRE}$ of the multiplexer $M_5$ is "0", the bias determination circuit unit $N_{17}$ is biased to the threshold voltage higher than a cut-off mode.

10. The single-input multi-output resonant regulating rectifier of claim 7, wherein the driving circuit unit includes a negative threshold gate driving circuit unit setting the third gate signal $V_{G,PR}$ to a negative threshold voltage $-V_{TH}$ by charging a capacitor $C_3$ to a threshold voltage $V_{TH}$ through a charging path according to the second reference signal $V_{REF\_PC}$ when the third gate signal $V_{G,PR}$ rises and discharging the capacitor $C_3$ through a discharging path when the third gate signal $V_{G,PR}$ falls, in generating the third gate signal $V_{G,PR}$ that falls at the seventh point in time $t_{P,PR}$ and rises at the sixth point in time $t_{E,PR}$.

11. The single-input multi-output resonant regulating rectifier of claim 1, wherein the third output circuit unit sets a point where the half-cycle input signal $V_{INN}$ input through the conversion circuit unit coincides with the third reference signal $V_{REF,PR}$ while decreasing as a reference starting point, and then adjusts a gate width length in a left direction to generate the third gate signal $V_{G,PR}$.

12. The single-input multi-output resonant regulating rectifier of claim 7, wherein the total comparator included in the third output circuit unit further includes a bridge circuit unit having an SR latch circuit unit, and receiving the comparator output signal $V_{CMP,PR}$ at an R-input terminal and receiving an end protection control signal at an S-input terminal and then generating an output signal $V_{Q,PR}$ that falls at the end protection signal and rises at the seventh point in time, and the PWM controller delays the output signal $V_{Q,PR}$ of the bridge circuit unit to generate the output signal $V_{P,PR}$ that falls at the seventh point in time.

13. The single-input multi-output resonant regulating rectifier of claim 12, wherein the PWM controller receives the third reference signal $V_{REF,PR}$ through a positive input terminal and the target voltage $V_{TG,PR}$ through a negative input terminal in a crossed structure.

* * * * *